Dec. 22, 1942.  P. MAISCH  2,305,809
COUPLINGS FOR TUBULAR LINES
Filed May 23, 1939

Inventor
Paul Maisch,
By John C. Brady
Attorney

Patented Dec. 22, 1942

2,305,809

UNITED STATES PATENT OFFICE 2,305,809

COUPLING FOR TUBULAR LINES

Paul Maisch, Karlsruhe, Germany; vested in the Alien Property Custodian

Application May 23, 1939, Serial No. 275,305
In Germany April 28, 1938

3 Claims. (Cl. 285—175)

This invention relates to a coupling for tubular lines, such as pipes, flexible hoses and the like.

It is an object of the present invention to provide a coupling for easy and quick connection and disconnection of pipes and hoses.

Another object of the invention is to provide a coupling which is safe against high operating pressures.

Still another object of the invention is to provide a coupling in which the pressure between the packing surfaces is low during the coupling action so that the coupling members can be connected and disconnected by a short movement and small relative rotation of the two coupling members, without impairing the reliable packing action against high working pressures.

With these and further objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which—

Similar reference numerals denote similar parts in the different views.

Figure 1:
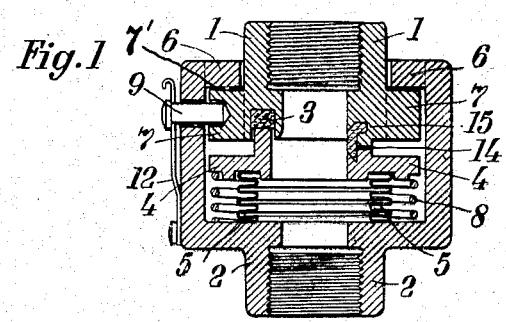
Figs. 1, 3 and 4 show axial sections of three different embodiments of pipe couplings having the invention applied thereto.
Figure 2:
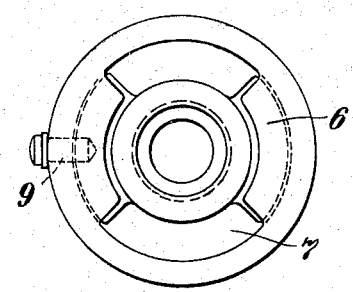
Fig. 2 is an end view of the coupling shown in Fig. 1.

Referring now to the drawing in greater detail, and first to Fig. 1, left hand side, and Fig. 2, it will be seen that the coupling comprises two coupling members 1 and 2 which are provided at their outer ends with female threads for effecting a screw connection with the associated pipe ends. A packing ring 3 is of a suitable resilient material, such as, rubber, is provided in an annular recess of the part 1 and a metallic ring 4 of L-shaped cross section engages the packing ring 3 and is pressure tightly connected to the part 2 of the coupling, by means of a bellows or corrugated tube 5 forming a pressure-proof seamless joint.

The parts 1 and 2 are coupled together in known manner, by a bayonet catch or fixing system comprising coupling claws 6 and 7 which are engaged with each other and locked by rotation through a small angle as best seen from Fig. 2. The ring 4 of the part 2 of the coupling is thereby engaged with the packing ring 3, under slight pressure exerted by the bellows 5.

Now, if an overpressure is produced within the coupling, the bellows 5 will expand and an axially acting thrust is produced by the annular differential surface corresponding to the difference between the mean diameter of the elastic bellows and the diameter of the ring 4 acted upon by the pressure, whereby the ring 4 is forced against the packing 3 with a force which grows with increasing pressure of the working agent flowing through the coupling. The forces occurring in an outward direction are taken up by the interengaged claws 6 and 7 of the parts 2 and 1.

In addition, a helical spring 8 may be arranged coaxial with the bellows 5 for pressing the ring 4 against the packing 3 and forming a tight joint when the coupling is not acted upon by pressure.

It will be clear that in the coupling shown in Fig. 1, the parts 1 and 2 are relatively turned when they are coupled together, while in the coupled condition they cannot be relatively turned. Where relative turning of the two coupling members is required, or where the coupling members must not be rotated in the coupling operations, a cap member may be provided as indicated at 10 in Fig. 3. The coupling claws 7 are provided on the coupling member 1 as in Fig. 1, while the cooperating claws 6' are provided on the cap member 10 which by means of an inner flange 11 engages behind an outer flange of the coupling member 2'. A spring 8' is in this case provided inside the bellows 5 instead of the surrounding arrangement of the spring 8 in Fig. 1. In this manner, the bellows can be made correspondingly larger in diameter.

Figure 3:
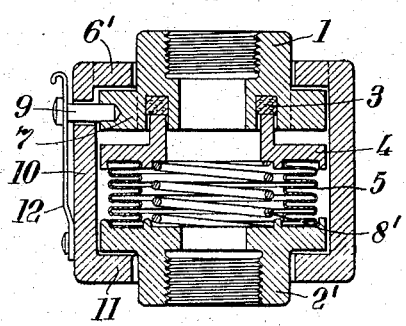

The coupling claws 6 or 6' and 7 may be interlocked in their engaged positions, by means of a pawl 9 arranged on a spring 12 secured to the member 2, Fig. 1, or to the member 10, Fig. 3, for automatic engagement with a corresponding recess 7' in one of the claws 7 of the coupling member 1.

The elastic or resilient connection between the member 2 and the ring 4 may be formed in any suitable manner so as to be tight against pressure. Advantageously, a seamless metallic bellows 5 is used, the corrugation of which permits axial movement of the ring 4. This bellows 5 may be connected with the members 2 and 4 by welding, soldering or screwing to form a pressure-tight joint.

Figure 4:
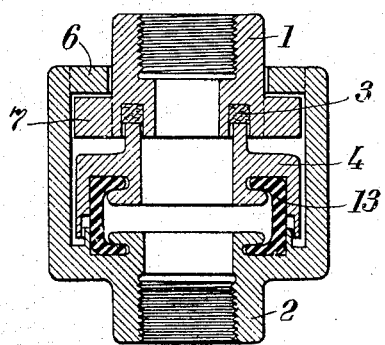

By way of alternative, a rubber collar or sleeve may be used, as shown at 13 in Fig. 4, and the ends thereof may be connected to the parts 2 and 4 by vulcanizing. The outer surface of the sleeve 13 is guided on tubular projections of the members 2 and 4, so as to impart the requisite stiffness to the sleeve.

It will be seen from Fig. 1, that the two sides of the coupling are differently constructed inasmuch as on the left hand side, a packing ring 3 is seated in a recess of the coupling member 1, for engagement of the projection of the ring 4, while on the right hand side, the two coupling members 1 and 4 engage each other directly at 14 and are additionally packed by means of a resilient ring 15 which may take any suitable shape and engages the coupling members 1 and 4 resiliently. The latter construction affords an additional stiffening action of the two coupling members. The coupling member 2 in Figs. 1 and 4 which is in the form of a sleeve or casing, may consist of two separate parts which are axially screwed together to facilitate introduction of the inner parts; the same applies with respect to the sleeve 10 in Fig. 3.

I am aware that many further changes may be made and numerous details of construction may be varied through a wide range without departing from the principles of this invention, and I, therefore, do not propose limiting the patent granted hereon otherwise than is necessitated by the prior art.

I claim:

1. A coupling for a tubular conduit comprising two coupling members, means for mechanically engaging said members in loosely connected relation, means cooperative with the aforesaid means for locking said members in engaged relation, one of said members including an annular recess, packing means disposed in said recess, a flanged ring having a tubular portion extending into said annular recess in one of said coupling means, a substantially tubular body member connected at one end with one of said coupling members and connected at the opposite end with said flanged ring, said substantially tubular body member being axially expansible in the direction of said coupling members for maintaining a fluid-tight connection between said members.

2. A coupling for a tubular conduit comprising two coupling members, means for mechanically engaging said members in loosely connected relation, means cooperative with the aforesaid means for locking said members in engaged relation, one of said members including an annular recess, packing means disposed in said recess, a flanged ring having a tubular portion extending into said annular recess in one of said coupling means, a substantially tubular body member connected at one end with one of said coupling members and connected at the opposite end with said flanged ring, said substantially tubular body member being axially expansible in the direction of said coupling members for maintaining a fluid-tight connection between said members, and a coil spring concentrically disposed with respect to said substantially tubular body member and interposed between one of said coupling members and said flanged ring.

3. A coupling for a tubular conduit comprising two coupling members, means for mechanically engaging said members in loosely connected relation, means cooperative with the aforesaid means for locking said members in engaged relation, one of said members including an annular recess, packing means disposed in said recess, a flanged ring having a tubular portion extending into said annular recess in one of said coupling means, a substantially tubular body member connected at one end with one of said coupling members and connected at the opposite end with said flanged ring, said substantially tubular body member being axially expansible in the direction of said coupling members for maintaining a fluid-tight connection between said members, and a coil spring concentrically disposed within said substantially tubular body and confined between one of said coupling members and the said flanged ring member.

PAUL MAISCH.